EFFECT OF THE RELATIVE PRESSURE ON THE DESORPTION RATE CONSTANT AT 40°, 55° and 70°C.

VARIATION OF THE DESORPTION RATE CONSTANT AS A FUNCTION OF THE PRESSURE, AT 55°C., FOR FLOWS OF 4, 5.5 and 7.6 l. OF $N_2/hr.$
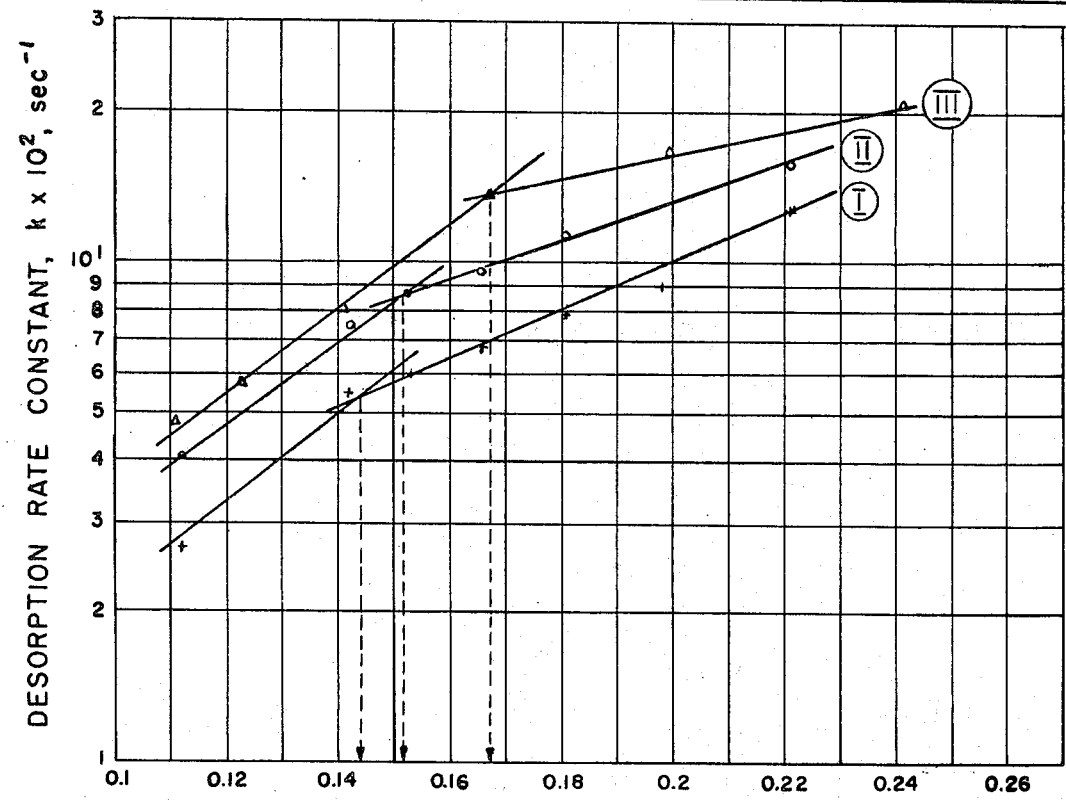
FIG. 3  RECIPROCAL OF ABSOLUTE PRESSURE, $kg/cm^{2^{-1}}$
EXTRAPOLATION OF THE PRESSURE CORRESPONDING TO THE MODIFICATION OF THE INTERACTION OF THE PVC-GASEOUS VC SYSTEM AT 55°C. TO ZERO ELUTION FLOW
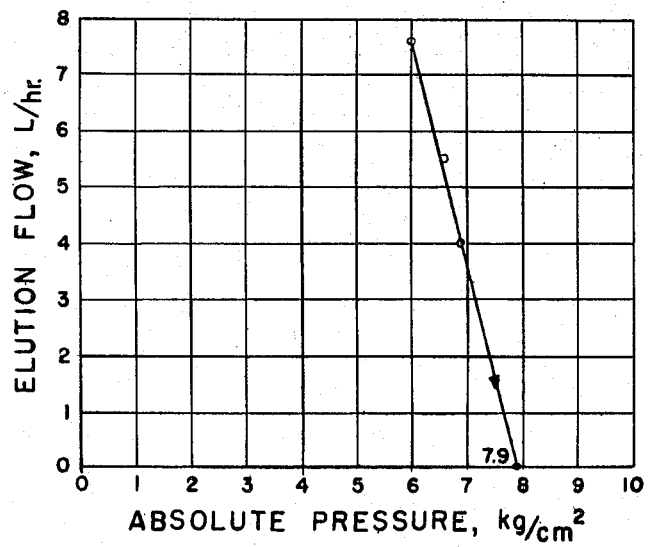
FIG. 4

United States Patent Office 3,692,718
Patented Sept. 19, 1972

3,692,718
GAS PHASE POLYMERIZATION OF VINYL CHLORIDE
Jean Pierre Golstein, Brussels, Belgium, assignor to Solvay & Cie, Brussels, Belgium
Continuation-in-part of application Ser. No. 663,540, Aug. 28, 1967. This application June 22, 1970, Ser. No. 48,185
Claims priority, application Belgium, Aug. 29, 1966, 32,626
Int. Cl. C08f 1/00
U.S. Cl. 260—23 XA                 10 Claims

ABSTRACT OF THE DISCLOSURE

Polyvinyl chloride is prepared by contacting gaseous vinyl chloride with a free radical initiator in the complete absence of a liquid phase and in the presence of an inert solid, at a temperature between about 40 and 80° C. and at a pressure above the polyvinyl chloride-gaseous vinyl chloride modification point and below the saturated vapor pressure of vinyl chloride.

---

This is a continuation-in-part of my copending U.S. application Ser. No. 663,540 filed on Aug. 28, 1967, now abandoned.

BACKGROUND OF THE DISCLOSURE

This invention relates to a process for polymerizing vinyl chloride in the gaseous state and in the complete absence of a liquid phase. In particular, the present process involves polymerizing gaseous vinyl chloride in the absence of liquid and in the presence of a free radical initiator and an inert solid under particular conditions of temperature and pressure whereby high yields of polyvinyl chloride having especially desirable properties are obtained.

Present processes for the polymerization of vinyl chloride employ a liquid suspension, emulsion or mass of vinyl chloride. In the mass polymerization of vinyl chloride, the polymerization is carried out at the saturated vapor pressure of vinyl chloride and hence liquid vinyl chloride is in equilibrium with its saturated vapor in this process.

A shortcoming of suspension polymerization procedures is that the properties of the resultant product are affected by the various substances in the reaction mixture other than the monomer. In particular, the resins obtained are of insufficient transparency for many applications. Moreover, in all of the liquid state processes, including mass polymerization, crustations occur in the polymerization autoclave. This is a very serious problem as it is a source of contamination of the resin product. Additionally, repeated thorough cleaning of the polymerization autoclave is required due to the presence of crustation residues. In fact, the crusting of the polymerization reagent in particular has delayed the perfection of continuous industrial processes for the polymerization of vinyl chloride.

Moreover, polymers obtained by means of liquid state processes must be separated from the liquid phase and then washed and dried; and in addition, generally, unreacted monomer must be purified before being recycled to the polymerization reactor.

Attempts have been made to overcome some of these problems by reducing the volume of the liquid present during the polymerization. According to French Pats. 1,087,197 and 1,117,753, a mixture of liquid monomer and powdered polymers is polymerized in the absence of solvent and diluent, the proportion of solid to liquid being maintained at a relatively high level. This process, however, presents serious difficulties both technically and economically. It is necessary to effect the polymerization in the presence of enormous amounts of powdered polymers, about one-fourth to one-third of the volume of the reactor, whereby the proportion of monomer to polymers in the reactor is low. Also, the polymer particles present in the reactor must be quite large, between about 0.1 and 2 mm. Additionally, in these processes, the polymer particles must be porous to facilitate the absorption of liquid monomer. Finally, these processes require the continuous addition of a catalyst during the entire course of the polymerization and, moreover, the polymer obtained is highly contaminated by the catalyst.

Though the inherent defects of the presence of a liquid phase during the polymerization of vinyl chloride has been recognized and attempts to remedy these defects by reducing the volume of the liquid phase have been made, the presence of a liquid phase has always been regarded as indispensable to the success of the polymerization operation.

SUMMARY OF THE INVENTION

It has been found that the foregoing difficulties may be overcome by polymerizing gaseous vinyl chloride in the complete absence of a liquid phase during the entire polymerization and in the presence of a free radical initiator.

According to the invention, high yields of polyvinyl chloride are obtained by polymerizing gaseous vinyl chloride at a temperature between about 40 and 80° C. and a pressure above the polyvinyl chloride—gaseous vinyl chloride modification point and below the saturated vapor pressure of vinyl chloride, in the absence of a liquid phase and in the presence of a free radical initiator and an inert solid.

BRIEF DESCRIPTION OF THE DRAWING

FIG. 3 is a diagram which shows the variation of the log of the desorption rate constant for the system polyvinyl chloride—vinyl chloride as a function of the reciprocal of the absolute pressure for different rates of elution; curve I is for an elution rate of 4, curve II for an elution rate of 5.5 and curve III for an elution rate of 7.6 liters of nitrogen per hour.

FIG. 4 is a diagram which shows the variation of the absolute pressure at which a modification of the interaction of a polyvinyl chloride-vinyl chloride system at 55° C. occurs with varying rates of elution, in liters of nitrogen per hour.

DESCRIPTION OF THE INVENTION

Figure 1:
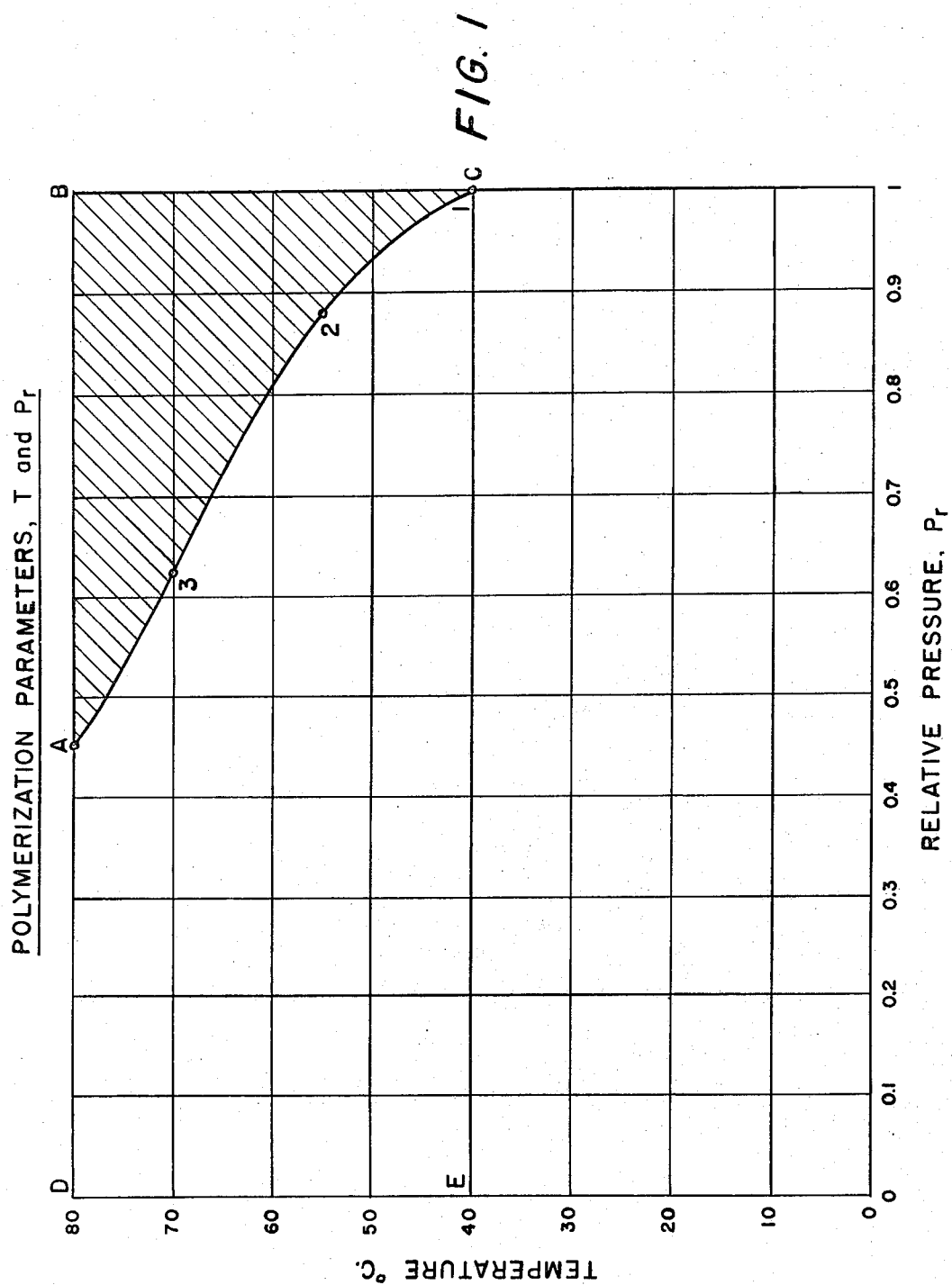
FIG. 1 is a diagram which illustrates the conditions of temperature and pressure, which are defined by the hatched area within the boundaries ABC, under which polymerization of vinyl chloride is carried out according to the present invention.

Polymerization according to the present invention is carried out in the presence of a catalyst or catalyst system conventionally used for the polymerization of vinyl chloride and, in particular catalysts which generate free radicals, i.e. free radical initiators. For example, organic peroxide such as lauroyl peroxide, benzoyl peroxide, peroxydicarbonates, azo-bisisobutyronitrile, tert-butyl perphthalate, and the like, may be used alone or in combination. The amount of catalyst employed is preferably from 0.01 to 5% by weight based on the weight of the monomer. According to the present invention, vinyl chloride in the gaseous state is polymerized in the presence of a finely subdivided solid material which is inert under the conditions of polymerization. This solid serves principally as a dispersant or carrier for the catalyst; it has been found that the increased dispersion of the catalyst improves the polymer yield. The only critical requirement for the solid is that it does not constitute or contain an inhibitor of the polymerization.

The inert solid material may be in the form of powder, granules, fibers or other finely subdivided form, preferably, the particle size of the solid is between about 30 and 180 microns. Generally, the inert solid is used in an amount of about 1 to 20% by weight based on the weight of the polyvinyl chloride obtained.

Particular materials which may be used as the solid dispersant include asbestos, silica, perlite and the like. Resins in powder, granular or other subdivided form, particularly polyvinyl chloride itself are preferred solid dispersants of the present process. Preferably, the resin employed as a solid dispersant is in a very fine subdivided state.

Polymerization of vinyl chloride according to the present invention is carried out at a temperature between about 40 and 80° C. At a temperature below about 40° C., polymerization in the gaseous phase is not economical, the rate of polymerization is too slow for industrial use. At a temperature above about 80° C., the polyvinyl chloride is obtained in less desirable condition, since at about 80° C., polyvinyl chloride granules tend to agglomerate.

It has been discovered that at a polymerization temperature of about 40 to 80° C., exceedingly high yields of polyvinyl chloride are obtained when the polymerization reaction is carried out at a relative pressure ($p_r$) which is equal to or more than 0.45 and less than 1, i.e. less than the saturated vapor pressure of polyvinyl chloride at the temperature of the polymerization. It has also been discovered that within the temperature range of 40 to 80° C. there is a pressure, which varies depending on the particular temperature, at which the interaction between solid polyvinyl chloride and gaseous vinyl chloride is modified. This point will be referred to hereinafter as the PVC–VC modification point. The variation of the relative pressure at which the PVC–VC modification point occurs at temperatures between 40 and 80° C. is defined by the line A–C of FIG. 1.

In FIG. 1, the horizontal straight lines EC and DB correspond to temperatures of 40° and 80° respectively and the vertical straight line BC corresponds to a relative pressure ($p_r$) of 1. The relative pressure is defined as the ratio between the polymerization pressure ($p$) and the saturated vapor pressure of the vinyl chloride, i.e.

$$p_r = \frac{p}{p_s}$$

The curve AC defines the locus of the PVC–VC modification point, the plotting of the curve AC will be described in greater detail hereinafter.

It has also been discovered, according to the present invention, that when the polymerization of gaseous vinyl chloride is carried out in the presence of a free radical initiator and an inert solid dispersant at a temperature between about 40 and 80° C. and a relative pressure above the PVC–VC modification point, but below the saturation vapor pressure of vinyl chloride, i.e. the condition of temperature and pressure defined within the hatched zone, ABC, of FIG. 1 that exceedingly high yields of polyvinyl chloride are obtained. The partial pressures at which a modification of the interaction of polyvinyl chloride and gaseous vinyl chloride occurs, i.e. the values defined by the line AC of FIG. 1, have been found by means of a method based on gas chromatography which is known as frontal analysis or continuous injection. In this procedure, an adsorbant, contained in a column, in the present situation, the adsorbant is polyvinyl chloride, is saturated by a continuous flow of gaseous vinyl chloride until a given pressure ($p_o$) is obtained; then the adsorbed vinyl chloride is eluted with a pure inert gas (such as $N_2$, Ar, Ne) called a carrier gas.

The desorption rate constant for the polyvinyl chloride-gaseous vinyl chloride system may then be determined under the conditions of temperature and pressure employed, by analyzing the composition of the gas during the desorption procedure as a function of time.

In the present system, the chosen temperature is between 40 and 80° C. and the pressure is between 3 kg./sq.cm. and the saturated vapor pressure of vinyl chloride. The following procedure was followed.

Polyvinyl chloride was degassed for one hour under pressure of $10^{-2}$ mm. of Hg before being introduced to the column. The polyvinyl chloride was then saturated with vinyl chloride by passing pure gaseous vinyl chloride at a given flow and a chosen temperature and pressure. After saturation was attained, elution was carried out with a given flow of nitrogen of the same volume as the vinyl chloride flow, the total pressure being maintained constant and equal to $p_o$.

From the desorption curve obtained thereby, the desorption constant, $k$, was calculated by means of the relationship:

$$p = p_o \cdot e^{-kt}$$

wherein $p_o$ is the maximum pressure of gaseous VC attained during the test, the value of which is identical to the total pressure in the apparatus, and $p$ is the partial pressure of gaseous VC in the eluate after an elution time $t$.

Figure 2:
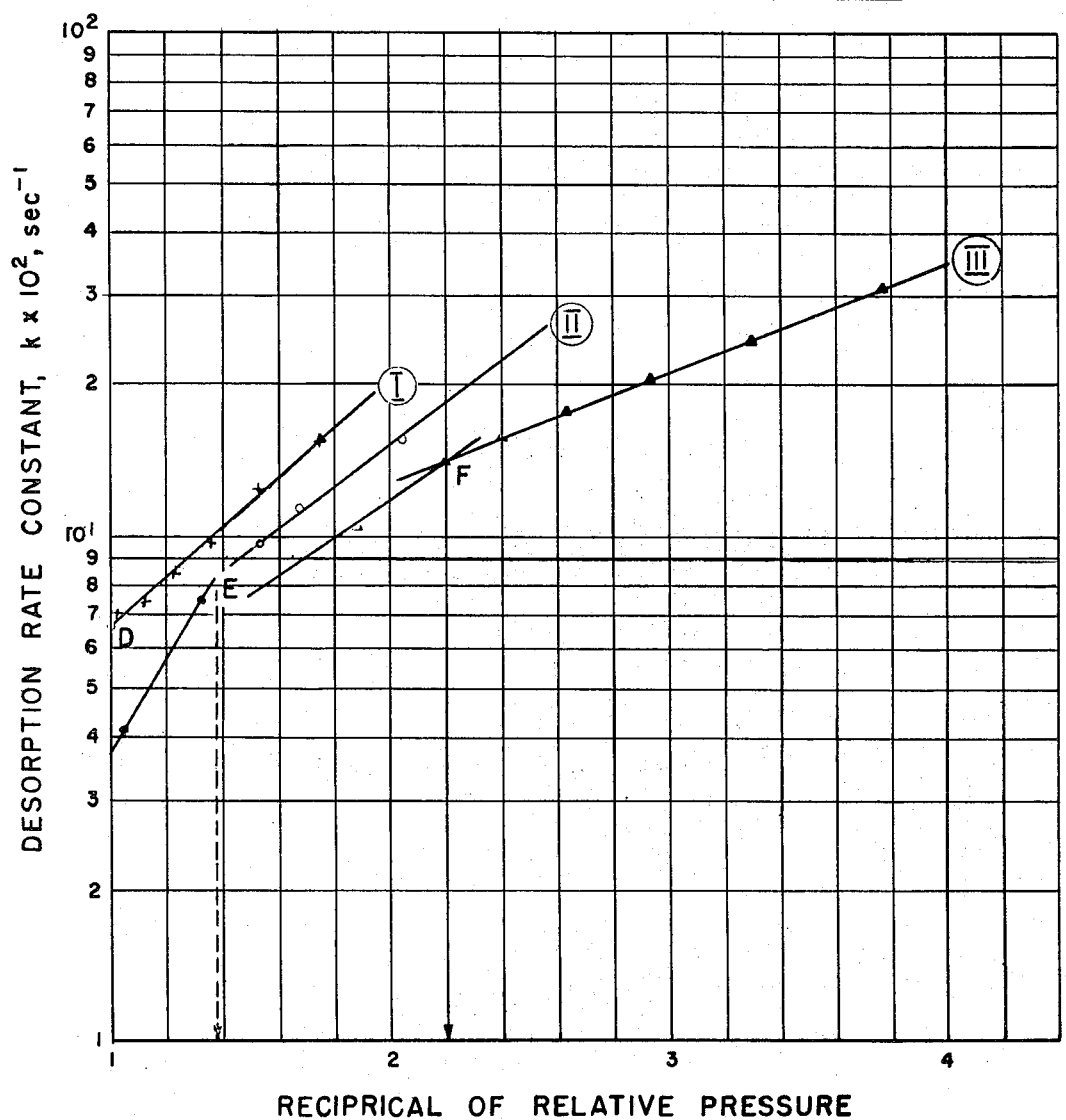
FIG. 2 shows the variations of the log of the desorption rate constant for the system polyvinyl chloride—vinyl chloride as a function of the reciprocal of the relative pressure of vinyl chloride at temperatures of 40° C. (curve I), at 55° C. (curve II) and at 70° C. (curve III).

The diagram of FIG. 2 shows the variations of the log of the desorption rate constant, $k$, as a function of the relative pressure, $p_r$, at temperature of 40° C. (curve I), 55° C. (curve II) and 70° C. (curve III) and an elution flow of 5.5 l. of nitrogen/hr.

For temperatures above 40° C., as shown on FIG. 2, it has been found that the relationship between log $k$ and the reciprocal of the partial pressure is represented by two parts of straight lines of different slopes, the intersection of which shows a clean break. In other words, for any temperature superior to 40° C. there is a pressure above which the interactions of the system polyvinyl chloride-vinyl chloride are clearly modified.

It has also been found that the relative pressure corresponding to this break, or PVC–VC modification point varies depending on the elution flow. Further, it is desirable to determine the relative pressure corresponding to the PVC–VC modification at no, or zero elution flow. This then is the relative pressure at which the interactions of polyvinyl chloride and gaseous vinyl chloride are actually modified independent from an elution flow effect and this is determined in the following manner.

As shown in the diagram of FIG. 3 wherein the log of the adsorption rate constant has been plotted against the reciprocal of the absolute pressure for three different rates of elution at a temperature of 55° C., namely elution flows of 4 l. $N_2$/hr. (curve I), 5.5 l. $N_2$/hr. (curve II) and 7.6 l. of $N_2$/hr. (curve III). By plotting the value of the pressure corresponding to the break or modification point as a function of the elution flow, the pressure corresponding to the break for a zero flow of eluate may be determined by extrapolation.

An example of such an extrapolation is illustrated in the diagram of FIG. 4 wherein the variation of the pressure at the break or modification point of elution at 55° C. for flows of 4, 5.5 and 7.6 l, of $N_2$/hr. have been plotted and then extrapolated to zero flow.

The corresponding relative pressure has been obtained by dividing the value of the extrapolated pressure by the value of the saturated pressure of vinyl chloride at 55° C. (9 kg./sq.cm.):

$$p_r = \frac{p}{p_s} = \frac{7.9}{9} = 0.88$$

The value 0.88 constitutes point 2 of curve AC on the diagram of FIG. 1.

Similar tests and analyses at 70° C. have provided point 3 of the curve AC of the diagram of FIG. 1.

It should be noted that the vertical line BC of the diagram of FIG. 1 corresponds to $p_r=1$, i.e. the saturated vapor pressure of vinyl chloride. The two horizontal lines CE and BD correspond to temperatures of 40 and 80° C.

At 40° C., the pressure limit corresponding to the PVC–VC modification point coincides with the saturation point $p_r=1$, and its value is not influenced by the elution flow and therefore explains point 1 of the curve AC. The curve AC has been obtained by joining the extrapolated points 1, 2 and 3 obtained as indicated above.

For a given temperature, the curve AC shows the relative pressure above which the interaction between gaseous vinyl chloride and solid polyvinyl chloride are modified and as has been found by the present invention, become such that the polymerization of gaseous vinyl chloride becomes particularly desirable and efficient. That is, under the conditions defined by the hatched zone ABC, gaseous vinyl chloride interacts sufficiently with polyvinyl chloride to provide an economic polymerization reaction under gaseous conditions, whereby yields comparable to those obtained by known optimized processes of suspension, bulk and emulsion polymerization are attained.

The break determined and set forth in the diagram of FIG. 2, as described above, determines for each temperature, the value of the relative pressure which when extrapolated to zero flow of eluate, as illustrated by the diagrams of FIGS. 3 and 4, indicates the pressure of gaseous vinyl chloride which is to be exceeded in order that the polyvinyl chloride-vinyl chloride system be in the particularly advantageous area of polymerization.

At 40° C., it is necessary to use a relative pressure above one, i.e. above the saturation pressure, in order that the polyvinyl chloride-vinyl chloride system be within the desirable area of polymerization; however, as already discussed, the presence of liquid is specifically to be avoided in the present process.

Thus, the limits of the hatched area of diagram 1 are excluded from the area of desirable working conditions of the present invention.

It should also be noted that the higher the polymerization temperature within the range of 40 to 80° C., the lower the relative pressure needed to realize the desirable conditions of polymerization according to the present invention.

According to one procedure used to carry out the method of the invention, the free radical initiator in powder or other subdivided forms and the solid dispersant are introduced into a polymerization autoclave provided with an agitator which is in operation. Most preferably, the solid dispersant and free radical initiator are introduced in the form of a homogeneous mixture. The temperature of the autoclave is raised to a temperature between about 40 and 80° C. and vinyl chloride is then introduced to obtain a pressure in the autoclave which is above the PVC–VC modification point and below the saturated vapor pressure of the vinyl chloride at the polymerization temperature. After the polymerization reaction has started, the pressure in the autoclave drops, however, this is maintained at its initial value, or at least at a value above PVC–VC modification point and below the saturated vapor pressure during the entire course of the reaction. This is generally accomplished by the addition of vinyl chloride in an amount needed to maintain the desired pressure during the course of the reaction.

For the example, the quantity of vinyl chloride introduced to a reactor of 200 l. capacity is about 3.5 to 40 kg./hr., more preferably about 10 kg./hr. Polyvinyl chloride obtained in this manner is in the form of a white powder which requires neither draining nor drying.

The solid dispersant is introduced into the polymerization reactor prior to the beginning of polymerization. The quantity of the solid dispersant employed may be varied and the ratio of the quantity of the dispersant to the quantity of the monomer to be polymerized is not critical. In order to assure a normal and desirable productivity of the reactor, however, the quantity of solid dispersant employed should be as small as possible. In fact, one of the advantages of the method of the invention is that a very small amount of solid dispersant is effective. Thus, a very small proportion of solid dispersant may be used at the beginning of the process since the polymerization leads to the formation of new particles of resin and the size of the particles initially introduced are not substantially increased.

It should be noted in this regard that the desired pressure-temperature zone of operation for the present process is applicable regardless of the nature of the solid dispersant, even though the discovery of the curve defining the locus of the modification of the polyvinyl chloride-gaseous vinyl chloride interactions has been based on a dispersant of polyvinyl chloride. As soon as the polymerization of polyvinylchloride has been initiated, the dispersant, whatever its nature, is coated with a film or layer of polyvinyl chloride and in addition, new particles of polyvinyl chloride are continuously formed; hence, once polymerization has begun, the interaction between polyvinyl chloride and gaseous vinyl chloride is important no matter what dispersant has been used initially.

The agitation of the reaction medium has an important influence on the polymerization yield. Accordingly, the solid contained in the polymerization reactor is subjected to continuous agitation. Preferably, agitators of the type used for mixing and homogenizing of powdered products are employed, such as ribbon blenders, frame agitators, scraper-blade agitators and the like.

The method of the invention is useful not only for the homopolymerization of vinyl chloride but also for the copolymerization of vinyl chloride with other ethylenically unsaturated monomers, for example, ethylene, propylene and the like. Therefore, reference in the specification and claim to the polymerization of vinyl chloride is intended to include not only the homopolymerization of vinyl chloride but also such copolymerizations.

According to yet another aspect of the invention, it is found that the stability of the polyvinyl chloride produced is increased by the introduction into the reactor, before the polymerization, of stabilizers in powdered or other subdivided form, the identity of the stabilizers being conventional and the only requirement for them other than to have a stabilizing effect is not to inhibit the polymerization. Stabilizers are generally used in an amount of about 1 to 3% by weight, based on the weight of polyvinyl chloride obtained.

Moreover, another feature of the invention is that the stabilizers can be employed as supports for the catalysts. Examples of the conventional stabilizers which may be employed are salts of fatty acids and, in particular, calcium, lead, barium and cadmium stearates and the like. By employing the catalysts as supports for the stabilizers, better dispersion of the stabilizers in the resin, and consequently, greater stabilization is obtained.

The method of the invention is simple and involves substantially no equipment or technical problems. Because of the absence of a liquid state in the reaction medium, the resins obtained do not require any draining or drying operations. Moreover, the unconverted monomers may be recovered in a gaseous form and immediately recycled to the polymerization reactor without a purification operation. Further, no crusting occurs in the reactor. Also, there is considerable increase in the rate of effective filling of the resin in the reactor.

The foregoing characteristics of the method of the invention and, in particuar, the absence of crusting in the reactor, make the method of the invention particularly suitable for continuous operation. This is particularly important in permitting the continuous polymerization of vinyl chloride.

The essential characteristic of the method of the invention which permits this result is the continued formation of new polymer particles or grains rather than the increasing in size of the existing particles. If there were an increasing in size of the existing particles, the method could not be pursued for any considerable length of time and in no event could be performed continuously. Another important characteristic with regard to the continuous operation of the method of the invention is that the polymerization may be conducted for relatively long periods without the addition of more catalyst.

The products of the invention are also improved in that they are highly pure and, accordingly, of excellent transparency. This result is principally linked to the fact that no foreign substance, emulsifier, protective colloid, or the like, is present to contaminate the polymer during the course of polymerization.

Another feature of the invention is that resins of low molecular weight may readily be obtained at a much lower pressure than that necessary in the conventional processes of suspension, emulsion or mass polymerization. Moreover, in spite of the specific weight apparent by high settling (of about 0.7 to 0.8 kg./dm.$^3$), the resins obtained by the new process possess excellent properties of absorption of plasticizers.

The invention will now be further described by reference to the following exampes which must not be construed, however, as limiting the scope of the invention in any manner.

EXAMPLE 1

Into a 3 liter autoclave is introduced a homogenous mixture of 100 g. of polyvinyl chloride and 1 g. of lauroyl peroxide, the polyvinyl chloride constituting a dispersant or support for the lauroyl peroxide. The autoclave is provided with a scraper-blade agitator which paddles with an inclination of 45° with respect to the axis, covering half the height of the reactor and which is continuously operated at 125 r.p.m. The temperature of the autoclave is raised to 59° C. and gaseous vinyl chloride is introduced so that the pressure in the autoclave is 8 kg./cm.$^2$; the relative pressure of the vinyl chloride is 0.84. The start of the polymerization reaction is marked by a drop in pressure. This drop is compensated for and the pressure is maintained at 8 kg./cm.$^2$ by successive further additions of gaseous vinyl chloride. After five hours of polymerization, the autoclave is cooled and degassed to remove excess vinyl chloride and 500 g. of white polyvinyl chloride powder is recovered from the reactor which, after subtracting the PVC introduced initially, corresponds to an hourly yield of 80 g., the polyvinyl chloride being ready for use, requiring no draining or drying.

EXAMPLE 2

The polymerization is carried out in exactly the same way as Example 1 but employing as the agitator, a ribbon blender agitator covering the overall height of the reactor and which is continuously operated at a speed of 250 r.p.m.

The amount of PVC produced during the polymerization is 800 g.; and 140 g. PVC/hour of reaction are recovered.

EXAMPLES 3 TO 5

The polymerizations are carried out with the same equipment as in Example 2 but under the conditions set forth in Table 1 below.

TABLE I

| Conditions of polymerization | Examples | | |
|---|---|---|---|
| | 3R | 4R | 5 |
| Temperature, ° C | 45 | 70 | 70 |
| Relative pressure corresponding to an absolute pressure, kg./sq. cm | 0.9 / 6.3 | 0.55 / 7.1 | 0.92 / 12 |
| Solid used as dispersant (PVC) g | 60 | 60 | 60 |
| Lauroyl peroxide, g | 1 | 1 | 1 |
| Duration of reaction, hours | 5 | 5 | 5 |
| Amount of PVC obtained, g | 110 | 260 | 760 |
| Production rate, g./hour | 10 | 40 | 140 |

Examples 3R and 4R show clearly that when polymerization is carried out under conditions of temperature and pressure which are outside the limits of hatched area ABC of the diagram of FIG. 1, PVC is produced at a very low rate compared to polymerization carried out under the temperature and pressure within the hached area as illustrated by Example 5.

EXAMPLES 6 TO 11

Other polymerizations are carried out in exactly the same manner as Example 2 but employing as catalysts the various materials and employing the various reaction times set forth hereinafter in Table 2.

The resins obtained possess similar characteristics. They are highly transparent and have a specific weight apparent by high settling, of about 0.7 to 0.8 kg./dm.$^3$. No crusting is observed in the polymerization autoclave.

TABLE 2

| | Example | | | | | |
|---|---|---|---|---|---|---|
| | 6 | 7 | 8 | 9 | 10 | 11 |
| Catalyst, g.: | | | | | | |
| Azo-bisisobutyronitrile | 1 | | | | | |
| Benzoyl peroxide | | 1 | | 2 | | |
| Tert-butyl perpivalate | | | 1 | | | |
| Lauroyl peroxide | | | | | 1 | 1 |
| Support, g.: | | | | | | |
| Polyvinyl chloride powder | 100 | 100 | 100 | | 50 | |
| Asbestos | | | | 50 | | 50 |
| Duration of reaction, hours | 4.5 | 5 | 4 | 4.75 | 5 | 4.75 |
| Amount of polyvinyl chloride produced during the polymerization, g | 700 | 365 | 820 | 400 | 500 | 450 |
| Hourly rate, g | 144 | 53 | 180 | 73.5 | 90 | 84 |

EXAMPLE 12

Into a 3 liter autoclave equipped with a scraper blade agitator which paddles with an inclination of 45° with respect to the axis and covers half the height of the reactor, is introduced a homogenous mixture of 100 g. of polyvinyl chloride powder, 1 g. of lauroyl peroxide and 1 g. of calcium stearate. The agitator is continuously operated at a speed of 125 r.p.m., the autoclave is heated to 58° C. and gasoeus vinyl chloride is introduced into the autoclave in a quantity such that the pressure in the autoclave is 8 kg./sq. cm. The relative pressure of the vinyl chloride is 0.87. This pressure is maintained during the polymerization by successive additions of gaseous vinyl chloride. After 9.5 hours, the polymerization is stopped by cooling the autoclave. Unreacted vinyl chloride is removed by degassing the autoclave. Six hundred eighty-eight g. of dry polyvinyl chloride powder is found in the autoclave, corresponding to an hourly rate of 83 g. The thermal stability of the polyvinyl chloride, determined by immersing samples of the same in an oil bath at 160° C., is 20 to 30 minutes. Similarly, for the purpose of comparison, this thermal stability of polyvinyl chloride obtained according to Example 2 is 10 to 20 minutes.

EXAMPLE 13

Into a 3 liter autoclave is introduced a homogeneous mixture of 100 g. of polyvinyl chloride and 3 g. of lauroyl peroxide. The autoclave is provided with a scraper blade agitator which paddles with an inclination of 45° with respect to the axis and covers half the height of the reactor which is continuously operated at a speed of 125 r.p.m., then, a gaseous mixture in a constant proportion of 625 parts of polyvinyl chloride and 10 parts of propylene is introduced into the autoclave in a quantity such that the pressure in the autoclave becomes 8.3 kg./sq.cm. The pressure is maintained at this level, during the polymerization, by successive additions of the mixture. After 11.5 hours of reaction, the polymerization is stopped by cooling the autoclave. Unconverted monomers are removed by degassing the autoclave. There is found in the autoclave 725 g. of a dry vinyl chloride-propylene copolymer containing 2% by weight of propylene units. The fikentscher K value of the copolymer, as measured in a dichlorethane solution, is 57.5. For comparison, another polymer is made in exactly the same manner but from vinyl chloride only, and it is found that the polyvinyl chloride obtained has a fikentscher K value, determined the same way, of 59.

EXAMPLES 14R, 15R and 16

For the purpose of comparison, employing a polymerization time of one hour and an autoclave temperature of 58° C. in a 3 liter autoclave, polymerization tests are carried out according to the process described in French Pat. No. 1,087,197 and, on the other hand, polymerizations are carried out according to the invention. In Examples 14R and 15R, 200 ml. of liquid vinyl chloride is polymerized in the presence of 500 g. of polyvinyl chloride. In Example 14R, the polyvinyl chloride employed is porous and has a particle size in the range of 0.1 to 2 mm. In Example 15R, the polyvinyl chloride employed is fine and dense, being nonporous and having particle sizes in the range of 63 to 88 microns. In Example 16, gaseous vinyl chloride is polymerized; 100 g. of polyvinyl chloride of the same specification as that employed in Example 15R is used. In Table 3, below, the particle sizes of the polyvinyl chloride initially employed as supports and the particle sizes of the polyvinyl chlorides obtained by the polymerizations are tabulated.

ide in the proportion of 0.5 g. of lauroyl peroxide per liter of the solution is introduced into the autoclave. At the time of such additions, the pressure in the autoclave increases. It is found necessary to include supplementary quantities of the initiator with the supplementary quantities of vinyl chloride if the polymerization is to continue more than a few hours and, moreover, without such supplementary additions it is also found that the product obtained does not have good properties. In Table 4 below, the pressure in the autoclave before each introduction of vinyl chloride and the pressure in the autoclave immediately after each introduction is tabulated against the polymerization time in hours; also the pressure drop occurring each hour is tabulated, i.e. the pressure drop occurring between the time of each addition of vinyl chloride and the time immediately before the next addition of vinyl chloride. After two hours, there is a general downward trend in the hourly pressure decrease, indicating that the speed of the reaction progressively decreases. After 9 hours of polymerization, the yield is 343 g. of polyvinyl chloride.

TABLE 4

| Polymerization time, hours | Pressure in the autoclave before the introduction of vinyl chloride kg./sq. cm. | Amount of vinyl chloride introduced into the autoclave, g. | Pressure in the autoclave after the introduction of vinyl chloride kg./sq. cm. | Pressure decrease during the hour, kg./sq. cm. |
|---|---|---|---|---|
| 0 | | 200 | 8.95 | |
| 1 | 7.9 | 35 (40 ml.) | 8.7 | 1 |
| 2 | 7.2 | 35 | 7.9 | 1.5 |
| 3 | 7 | 35 | 7.7 | 0.9 |
| 4 | 7 | 35 | 7.6 | 0.7 |
| 5 | 7.2 | 35 | 7.8 | 0.4 |
| 6 | 7.4 | 35 | 8 | 0.4 |
| 7 | 7.8 | 35 | 8.5 | 0.2 |
| 8 | 8.2 | 35 | 8.8 | 0.3 |
| 9 | 8.9 | | | |

TABLE 3

| | Particle size distribution, g./kg. at — | | | | | |
|---|---|---|---|---|---|---|
| | >180 microns | 180-128 microns | 128-88 microns | 88-63 microns | 63-42 microns | <42 microns |
| Example 14R: | | | | | | |
| Initial polyvinyl chloride | | 14 | 372 | 434 | 164 | 16 |
| Polyvinyl chloride obtained | 30 | 322 | 358 | 182 | 100 | 8 |
| Example 15R: | | | | | | |
| Initial polyvinyl chloride | | | | 1,000 | | |
| Polyvinyl chloride obtained | 115 | 616 | 202 | 67 | | |
| Example 16: | | | | | | |
| Initial polyvinyl chloride | | | | 1,000 | | |
| Polyvinyl chloride obtained | 20 | 462 | 149 | 24 | 345 | |

The results of Examples 14R and 15R indicate that there was no formation of new grains but rather the grains of polyvinyl chloride initially introduced have been enlarged and made denser. On the other hand, the results of Examples 16 indisputably prove that a formation of new grains of polyvinyl chloride occurred and, in particular of a majority quantity of grains smaller than the smallest of the grains of polyvinyl chloride initially introduced.

EXAMPLES 17R and 18

The first of these examples, Example 17R, is carried out according to the method of the above referred to French patent for comparative purposes. The second of these examples, Example 18, is carried out in the manner described in Example 1.

In Example 17R, 600 g. of porous polyvinyl chloride of the same specifications as that employed in Example 14R and 200 of liquid vinyl chloride in which 1 g. of lauroyl peroxide is dissolved are introduced to a 3 1. autoclave. The temperature in the autoclave is raised to 59° C. The pressure in the autoclave is 8.95 kg./sq.cm. After one hour of polymerization, the pressure drops to 7.9 kg./sq.cm. Such a decrease in pressure is due to the consumption of vinyl chloride in the polymerization. Each hour, in view of this consumption, an additional 40 ml. of liquid vinyl chloride containing dissolved therein lauroyl perox- In Example 18, vinyl chloride is polymerized under the same conditions as in Example 17 but is employed in a gaseous rather than a liquid state and moreover, no supplementary additions of catalyst are made. The pressure in the autoclave is maintained at 8 kg./sq. cm. by the successive introductions of gaseous vinyl chloride. After 5 hours of polymerization, 441 g. of polyvinyl chloride other than that initially present are obtained and after 12 hours, 1,150 g. are obtained. It is noted that the kinetics of the reaction are almost constant. About 100 g. of vinyl chloride are polymerized every hour.

Thus, it has been shown that the method of the invention permits the continuous polymerization of vinyl chloride without supplementary addition of catalyst, while the process described in French Pat. 1,087,197 requires the constant addition of catalyst during the entire polymerization and, even with this addition, it does not permit the continuance of the reaction for more than 8 hours.

While the invention has been described by reference to particular embodiments thereof, it is to be understood that these embodiments are intended to illustrate rather than to limit the invention and that the appended claims are intended to include within their scope not only these embodiments but also all obvious modifications and variations thereof.

What we claim as new and desire to secure by Letters Patent is:

1. Method for preparation of a homopolymer of vinyl chloride or copolymer of vinyl chloride with an α-olefin comprising polymerizing gaseous vinyl chloride in the complete absence of a liquid phase in the presence of a free radical initiator in a concentration between about 0.01 and 5% by weight based on the weight of vinyl chloride and in the presence of an inert solid in an amount of about 1 to 20% by weight based on the weight of vinyl chloride resin obtained, under agitation at a temperature between about 40° and 80° C. and under a pressure superior to the pressure at which the vinyl chloride resin-gaseous vinyl chloride interactions are modified and below the saturated vapor pressure of vinyl chloride at the polymerization temperature.

2. Method according to claim 1, in which the inert solid is polyvinyl chloride, and the relative pressure of vinyl chloride during the polymerization is defined by the relation $$0.45 \leq p_r < 1$$

3. Method according to claim 1, in which the temperature and pressure under which polymerization is carried out are within the hatched area (ABC) of the diagram of FIG. 1.

4. Method according to claim 1, in which the inert solid is selected from the group consisting of asbestos, silica and perlite.

5. Method according to claim 1 in which the inert solid is in the form of a fiber.

6. Method according to claim 1 in whic hthe polymerization of vinyl chloride is carried out also in the presence of a solid stabilizer in an amount of about 1 to 3% by weight based on the weight of the polyvinyl chloride obtained.

7. Method according to claim 6 in which the stabilizer is a salt of fatty acid.

8. Method according to claim 1 in which the polymerization is continued by the additions of gaseous vinyl chloride, without the introduction of additional initiator, into the polymerization reaction to maintain said pressure in the reaction.

9. Method according to claim 8 in which the polymerization is continued for a period of at least about 5 hours.

10. Method according to claim 8 in which the polymerization is continued for about 12 hours.

References Cited

UNITED STATES PATENTS

| | | | |
|---|---|---|---|
| 2,961,432 | 11/1960 | Fikentscher et al. | 260—92.8 X |
| 2,600,695 | 6/1952 | Sans | 260—92.8 |
| 2,924,591 | 2/1960 | Roelen | 260—95 X |

OTHER REFERENCES

"Vinyl and Related Polymers" by C. E. Schildknecht, pp. 392, 393 (1952).

DONALD E. CZAJA, Primary Examiner

D. J. BARRACK, Assistant Examiner

U.S. Cl. X.R.

260—87.5 C, 92.8 R, 95 R, 95 C, 884